United States Patent
Ruehl et al.

(10) Patent No.: US 11,912,633 B1
(45) Date of Patent: Feb. 27, 2024

(54) FERTILIZER COMPOSITION INCLUDING ANIMAL MANURE AND CEMENT KILN DUST

(71) Applicant: HOLCIM TECHNOLOGY LTD, Zug (CH)

(72) Inventors: Paul Ruehl, Rochester, MI (US); Travis Weide, Ossineke, MI (US)

(73) Assignee: HOLCIM TECHNOLOGY LTD, Zug (CH)

( * ) Notice: Subject to any disclaimer, the term of this patent is extended or adjusted under 35 U.S.C. 154(b) by 0 days.

(21) Appl. No.: 18/078,490

(22) Filed: Dec. 9, 2022

(51) Int. Cl.
*C05F 3/00* (2006.01)
*C05D 3/02* (2006.01)

(52) U.S. Cl.
CPC . *C05F 3/00* (2013.01); *C05D 3/02* (2013.01)

(58) Field of Classification Search
None
See application file for complete search history.

(56) References Cited

U.S. PATENT DOCUMENTS

2014/0150507 A1* 6/2014 Burnham ................. C05C 7/00
                                                                      71/21

FOREIGN PATENT DOCUMENTS

| CN | 107500902 A | * | 12/2017 | ............... C05F 3/00 |
| CN | 107500987 A | * | 12/2017 | ............... C05F 3/00 |
| CN | 107903108 A | * | 4/2018 | ............... C05F 3/00 |
| WO | WO 02/12139 A2 | * | 2/2002 | ............. C02F 11/00 |
| WO | WO 03/014031 A1 | * | 2/2003 | ............. C02F 11/14 |

* cited by examiner

*Primary Examiner* — Wayne A Langel
(74) *Attorney, Agent, or Firm* — Pillsbury Winthrop Shaw Pittman LLP

(57) ABSTRACT

A composition for use as fertilizer includes cement kiln dust and animal manure. The content of cement kiln dust and animal manure in the composition is selected as a function of either weight or volume. The content of cement kiln dust is greater than or equal to the content of animal manure. The fertilizer composition is formed by mixing the cement kiln dust and animal manure at ambient temperature and pressure.

9 Claims, No Drawings

FERTILIZER COMPOSITION INCLUDING ANIMAL MANURE AND CEMENT KILN DUST

TECHNICAL FIELD

The present disclosure, in various embodiments, relates generally to a composition for fertilizer and a method of making the fertilizer composition. More particularly, the composition comprises cement kiln dust and animal manure, which composition is abbreviated herein as MCF.

BACKGROUND

Cement production processes in current use in the U.S. generate cement kiln dust (CKD) as an intrinsic process residue. During cement production, kiln combustion gases flow countercurrent to the raw feed and exit the kiln under the influence of induced draft fans. The rapid gas flow and continuous raw feed agitation are turbulent processes that result in large quantities of particulate matter being entrained in the combustion gases. The entrained particulate matter (as well as various precipitates) is subsequently removed from the kiln exhaust gases by air pollution control equipment; this particulate matter constitutes CKD.

CKD is considered as a waste product to be removed from different locations within the kilns. If the CKD cannot be recycled in the cement industry or otherwise used in other industrial application, CKD is deposited into and contained within landfills.

In a seemingly unrelated industry, waste management is of particular concern to livestock owners. Among by-products of livestock operations is livestock manure. Proper waste management of livestock manure, which is regulated in the U.S. by the Environmental Protection Agency among other state and federal laws and regulatory authorities, is a growing concern as livestock operations intensify. Pollutants in livestock manure can have ecological impacts if released into surface water, ground water, soil, and the air. At present, livestock waste management systems include depositing and storing livestock manure in waste storage ponds, structures, and/or lagoons.

Ultimately, the proper construction and maintenance of landfills for CKD and waste storage facilities for livestock manure is expensive and limited in sustainability as production rates of these two by-products increase.

BRIEF SUMMARY

An objective of the present disclosure is to provide a product and associated method for repurposing the aforementioned waste products. More particularly, to address the foregoing waste management concerns in the cement manufacturing and livestock raising industries, the present disclosure proposes utilizing the waste products for fertilizer.

A fertilizer composition according to the present disclosure comprises cement kiln dust (CKD) and animal manure.

Certain preferred but non-limiting features of the composition are the following, taken individually or in combination:

a weight percent of the cement kiln dust in the fertilizer composition is greater than or equal to a weight percent of the animal manure in the fertilizer composition;

the weight percent of cement kiln dust is in a range from 50% to 70%, inclusive, wherein a remainder of the composition is the animal manure;

the animal manure comprises liquid cow manure;

a pH of the fertilizer composition is in a range from 11 to 13, inclusive;

a volume of the cement kiln dust in the fertilizer composition is greater than or equal to a volume of the animal manure in the fertilizer composition; and/or a ratio of the volume of the cement kiln dust to the volume of animal manure is in a range from 1:1 to 3:1, inclusive.

A method of forming the fertilizer composition as described above includes mixing a volume of cement kiln dust with a volume of animal manure, drying the mixture, and distributing the mixture over agricultural soil.

Certain preferred but non-limiting features of the method are the following, taken individually or in combination:

the volume of cement kiln dust and the volume of animal manure are mixed at ambient temperature and ambient pressure;

the volume of cement kiln dust is equal to or greater than the volume of animal manure; and/or the animal manure is liquid cow manure.

DETAILED DESCRIPTION

A fertilizer composition of the present disclosure comprises CKD and liquid animal manure (LAM). Preferably, the liquid animal manure is liquid cow manure (LCM). As used herein, the term "liquid" as used, in liquid animal manure or liquid cow manure refers to manure having a minimum water content of 60 weight %.

In some embodiments, the fertilizer composition comprises only CKD and LAM. In other words, the fertilizer composition consists of CKD and LAM.

The CKD used in the fertilizer composition may include fresh CKD, which refers to CKD that is taken directly from a concrete manufacturing site to an agricultural site for forming the fertilizer composition. The use of fresh CKD allows the rate at which CKD is disposed of as a waste material in the cement manufacturing process to be reduced. Alternatively or additionally, the CKD used in the fertilizer composition may include landfilled CKD, which refers to CKD that is taken from a landfill or other location in which CKD has been stored as waste for a period of time. The use of landfilled CKD allows for the reduction of the amount of CKD deposited within landfills as a result of cement manufacturing.

The bulk constituents in the chemical composition of CKD as used in the fertilizer composition are set forth in Table 1. The term "bulk constituents" refers to those constituents that exceed 0.05 percent by weight (wt %) in the CKD. Other trace constituents, or those constituents do not exceed 0.05 wt % in the CKD, may be present. As explained in further detail below, the content of calcium oxide (CaO) in the CKD is advantageous in fertilizer compositions as CaO increases the pH of the fertilizer composition such that the acidity of the soil over which the fertilizer composition is distributed is reduced.

TABLE 1

| Composition of Cement Kiln Dust (CKD) | | | | | | | | | | |
| --- | --- | --- | --- | --- | --- | --- | --- | --- | --- | --- |
| | $SiO_2$ | $Al_2O_3$ | $Fe_2O_3$ | CaO | MgO | Na* | $SO_3$ | $Na_2O$ | $K_2O$ | $P_2O_5$ |
| Avg (wt %) | 11.53 | 3.67 | 1.81 | 46.77 | 1.52 | 4.40 | 18.10 | 0.75 | 5.54 | 0.08 |
| Min (wt %) | 10.51 | 3.17 | 1.49 | 38.96 | 1.15 | 2.00 | 14.71 | 0.26 | 2.64 | 0.06 |
| Max (wt %) | 13.34 | 4.15 | 2.24 | 55.02 | 2.03 | 7.75 | 21.89 | 2.32 | 9.99 | 0.11 |

In preferred embodiments, the fertilizer composition comprises 100% by weight CKD and liquid cow manure (LCM). In other words, the fertilizer composition consists of CKD and LCM.

The composition of CKD and LCM in the fertilizer composition may be selected as a function of a relative volume of CKD to LCM. The fertilizer composition may include a greater volume of CKD than a volume of LCM or equal volumes of CKD and LCM. The volume ratio of CKB to LCM may be equal to or greater than 1:1 and less than or equal to 4:1 and, more preferably, equal to or greater than 1:1 and less than or equal to 3:1. The volume ratio of CKB to LCM may be 2:1, 2.5:1, or 3:1.

Alternatively or additionally, the relative composition of CKD and LCM in the fertilizer composition may be selected as a function of a weight percentage of CKD and LCM relative to the total weight of the fertilizer composition. As used herein, "weight percent (wt %)" is an expression of a weight percent of one component of the fertilizer composition relative to the total weight of the fertilizer composition.

The content of CKD in the fertilizer composition may be selected based upon characteristics of the soil to which the fertilizer composition is to be applied. For example, increasing the content of CKD in the fertilizer composition increases the pH of the fertilizer composition. Thus, the content of CKD in the fertilizer composition may be increased when there is a need to increase the pH of the soil.

The content of CKD in the fertilizer composition may also be selected based on the moisture content of the LCM. As explained in further detail below, CKD absorbs water present in the LCM such that a dry fertilizer composition, which is more easily spread over soil relative to a wet fertilizer composition, may be obtained. Therefore, a method of forming the fertilizer composition may include selecting a greater content of CKD when the moisture content of the LCM is relatively high.

The fertilizer composition may comprise at least 45 wt % CKD and up to 75 wt % CKD with a remainder of the fertilizer composition being LCM. In exemplary embodiments, the fertilizer composition may comprise 50 wt % CKD with a remainder of LCM, 60 wt % CKD with a remainder of LCM, 65 wt % CKD with a remainder of LCM, or 70 wt % CKD with a remainder of LCM.

A method of forming the fertilizer composition comprises mixing CKD with LCM. The fertilizer composition may be formed on-site such as on or near an agricultural field at which the fertilizer composition will be distributed on agricultural soil. Mixing may be achieved with a mobile mixer. The mobile mixer may include a scale for measuring the respective weight of CKD and LCM. The mobile mixer may also include twin shafts for combining the CKD and LCM. The CKD and LCM are mixed until a homogenous mixture is obtained.

Other equipment for mixing the CKD and LCM may be used. Some mixing equipment may not include a scale. In such cases, the composition of CKD and LCM may be selected based on volume rather than weight.

After mixing, the homogenous mixture is removed from the mixer and allowed to dry. The time for drying may vary based upon, for instance, the moisture content of the LCM. In general, the homogenous mixture is allowed to dry for a period of at least 72 hours. When the mixture is dry, the water content in the fertilizer composition is n a range extending from about 17 wt % to about 40 wt %, inclusive and, more preferably, from about 20 wt % to about 30 wt %, inclusive.

After drying, the mixture may be spread over agricultural soil using standard agricultural equipment.

In the mixing and drying process, the CKD serves as an absorbent and as a binder. The CKD absorbs the water from the LCM. When the CKD and LCM are combined, any heavy metals present in the CKD and LCM are stabilized by conversion to metal hydroxides, which are insoluble and non-hazardous particles. The metal hydroxides remain encapsulated within the binder of the CKD such that heavy metals will not leach out of the fertilizer composition of the present disclosure. Further, the cement clinker present in CKD is contained within the composition, which cement clinker would on its own be pozzolanic.

The method of forming the fertilizer composition according to the present disclosure offers several advantages. Present commercial fertilizers are frequently ammonia-based and are produced by the Haber process. The Haber process, also called the Haber-Bosch process, is a chemical process that takes nitrogen from the air and under high pressure (about 200-400 atm) and high temperatures (about 400-650° C.) to react and combine the nitrogen with hydrogen, which may be derived from methane, to produce ammonia. This ammonia may then be combined with nitric acid to produce ammonium nitrate fertilizers.

The production of the fertilizer composition according to the present disclosure requires neither high temperatures nor high pressures. The fertilizer composition of the present disclosure is formed by mixing CKD and LCM at ambient temperatures and pressures.

EXPERIMENTAL DATA

The following experimental data illustrates a detailed composition analysis of fertilizer compositions according to the present disclosure.

Experimental data is provided for the following samples:

Mixes 1 through 4 set forth in Table 2 were formed by mixing various volumes of CKD and LCM. The mixed volumes are expressed below as volume ratios of CKD to LCM.

Mix 1=mixture of 2 parts of CKD relative to 1 part of LCM (ratio 2:1)

Mix 2=mixture of 3 parts of CKD relative to 1 part of LCM (ratio 3:1)

Mix 3=mixture of 2.5 parts of CKD relative to 1 part of LCM (ratio 2.5:1)

Mix 4=mixture of 2 parts of CKD relative to 1 part of LCM (ratio 2:1)

Mixes 5 through 9 set forth in Table 3 were formed by mixing various weight percentages of CKD and LCM.

Mix 5=mixture of 48 wt % CKD and 52 wt % LCM
Mix 6=mixture of 60 wt % CKD and 40 wt % LCM
Mix 7=mixture of 55 wt % CKD and 45 wt % LCM
Mix 8=mixture of 70 wt % CKD and 30 wt % LCM
Mix 9=mixture of 60 wt % CKD and 40 wt % LCM For Mixes 5 through 8, the CKD used is landfilled CKD, and for Mix 9, the CKD is fresh CKD. Table 3 also includes an analysis of the composition of LCM without CKD added therein (i.e., 100 wt % LCM in the fertilizer composition).

Mixes 10 through 12 set forth in Table 4 were formed by mixing equal volumes of CKD and LCM. Accordingly, the volume ratio of CKD to LCM was 1:1 for each sample mixture.

TABLE 2

Composition MCF

| | Mix 1 | Mix 2 | Mix 3 | Mix 4 |
|---|---|---|---|---|
| Nitrogen (wt %) | 27 | 10 | 8 | 17 |
| Phosphorus (wt %) | 0.36 | 0.44 | 0.49 | 0.55 |
| Potassium (wt %) | 2.14 | 3.09 | 2.58 | 2.79 |
| Calcium (wt %) | 18.85 | 22.96 | 20.05 | 21.45 |
| CCE* (wt %) | 38.07 | 49.59 | 38.13 | 45.04 |
| pH | 12.29 | 12.42 | 12.41 | 12.31 |

*CCE, or calcium carbonate equivalent, refers to the acid neutralizing capacity of an agricultural liming material expresses as weight percentage of calcium carbonate CaCO3. For instance, a composition having a CCE of 38% means that 100 grams of the composition has an equivalent treating efficiency to 38 grams of pure CaCO3.

TABLE 3

Composition MCF (continued)

| | Mix 5 | Mix 6 | Mix 7 | Mix 8 | Mix 9 | LCM |
|---|---|---|---|---|---|---|
| Moisture (wt %) | 29.37 | 25.81 | 27.47 | 20.85 | 17.49 | 60.53 |
| Solids (wt %) | 70.63 | 74.19 | 77.53 | 79.15 | 82.51 | 39.47 |
| Nitrogen (wt %) | 0.129 | 0.091 | 0.107 | 0.077 | 0.085 | 0.309 |
| Phosphorous (wt %) | 0.043 | 0.035 | 0.036 | 0.029 | 0.027 | 0.144 |
| Potassium (wt %) | 1.169 | 1.458 | 1.496 | 1.637 | 1.799 | 0.195 |
| Calcium (wt %) | 12.908 | 16.297 | 15.168 | 16.261 | 19.429 | 0.998 |
| Magnesium (wt %) | 0.528 | 0.706 | 0.677 | 0.731 | 0.723 | 0.280 |
| Sulfur (wt %) | 2.622 | 3.327 | 3.122 | 3.476 | 4.526 | 0.089 |
| Boron (ppm) | 70 | 110 | 72 | 70 | 90 | 16 |
| Sodium (ppm) | 5,331 | 5,757 | 5,721 | 6,672 | 2,531 | 325 |
| Zinc (ppm) | 131 | 130 | 201 | 148 | 161 | 44 |
| Iron (ppm) | 5,259 | 15,248 | 6,064 | 6,619 | 8,430 | 1,396 |
| Manganese (ppm) | 236 | 364 | 283 | 303 | 350 | 44 |
| Copper (ppm) | 23 | 23 | 22 | 19 | 22 | 30 |
| Aluminum (ppm) | 6,435 | 8,161 | 7,774 | 8,407 | 10,135 | 922 |
| pH | 11 | 12 | 12 | 12 | 12 | 8 |

TABLE 4

Composition MCF (continued)

| | Mix 10 | Mix 11 | Mix 12 |
|---|---|---|---|
| Moisture (wt %) | 27.07 | 42.15 | 49.74 |
| Solids (wt %) | 72.93 | 57.85 | 50.26 |
| Nitrogen (wt %) | 0.10 | 0.20 | 0.28 |
| Phosphorous (wt %) | 0.10 | 0.14 | 0.13 |
| Potassium (wt %) | 2.02 | 1.35 | 1.28 |
| Calcium (wt %) | 22.62 | 19.20 | 15.46 |
| Magnesium (wt %) | 0.77 | 0.72 | 0.61 |
| Sulfur (wt %) | 3.12 | 2.11 | 1.16 |
| Sodium (wt %) | 0.26 | 0.23 | 0.36 |
| Zinc (ppm) | 101 | 98 | 127 |
| Iron (ppm) | 7,898 | 7,344 | 5,445 |
| Manganese (ppm) | 335 | 296 | 293 |
| Copper (ppm) | 20 | 18 | 23 |

To provide fundamental nutrients to plants in the soil, current commercial fertilizers include three primary nutrients: nitrogen, phosphorus, and potassium. The fertilizer compositions according to the present disclosure were analyzed to assess the presence of nitrogen, phosphorus, and potassium. The weight percentage of nitrogen, phosphorus, and potassium within each experimental mixture are set forth in Tables 2 through 4.

The above experimental data also includes an analysis of the pH of the fertilizer composition, which was measured using pH paper. The pH of agricultural soil has an influence on the availability of soil nutrients to plants. To increase the pH levels of soil, agricultural limestone is frequently spread over the surface of the agricultural soil. Such agricultural limestone is separate from commercial fertilizer that may also be distributed over the soil.

Due to the pH levels of the disclosed fertilizer compositions, which is principally influenced by the CaO content in the CKD, additional agricultural limestone that is distinct from fertilizer is not required. This results in an overall reduction of agricultural costs because farmers do not need to purchase the agricultural limestone and because it is not necessary to separately distribute the agricultural limestone and fertilizer. Thus, both material and labor costs are reduced. The various fertilizer compositions have a pH in a range from about 11 to about 13 and, more preferably, from about 11 to about 12.

The basic pH values of the fertilizer compositions were further observed to reduce the odor of the LCM. In addition, the basic pH kills pathogens within the LCM and prevents the formation of $H_2S$. Finally, the CaO in the composition may influence the texture or hardness of the soil to which it is applied. By way of non-limiting example, it was discovered that the fertilizer composition reduced the hardness of clay soil.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors.

What is claimed is:

1. A method comprising:
   mixing a volume of cement kiln dust with a volume of animal manure;
   drying the mixture to form a fertilizer composition having pH in a range from 12 to 13, inclusive; and
   distributing the fertilizer composition over agricultural soil.

2. The method of claim 1, wherein the volume of cement kiln dust and volume of animal manure are mixed at ambient temperature and ambient pressure.

3. The method of claim 1, wherein the volume of cement kiln dust is equal to or greater than the volume of animal manure.

4. The method of claim 1, wherein the animal manure is liquid cow manure.

5. The method of claim 1, wherein a ratio of the volume of the cement kiln dust to the volume of animal manure is in a range from 1:1 to 3:1, inclusive.

6. The method of claim 1, wherein the mixture consists of cement kiln dust and animal manure.

7. A method comprising:
   mixing cement kiln dust with animal manure to form a mixture, wherein a weight percent of the cement kiln dust in the mixture is greater than or equal to a weight percent of the animal manure in the mixture;
   drying the mixture to form a fertilizer composition having pH in a range from 12 to 13, inclusive; and
   distributing the fertilizer composition over agricultural soil.

8. The method of claim 7, wherein the weight percent of cement kiln dust is in a range from 50% and 70%, inclusive, and wherein a remainder of the composition is the animal manure.

9. The method of claim 7, wherein the animal manure is liquid cow manure.

\* \* \* \* \*